United States Patent Office 3,179,694
Patented Apr. 20, 1965

3,179,694
PROCESS FOR THE PREPARATION OF UNSATURATED NITRILES
Cyrille Van Eygen, Watermael-Boitsfort, Pol Lambert, Uccle, and Antonin Hendrickx, Anderlecht, Belgium, assignors to UCB (Union Chimique-Chemische Bedrijven), S.A., Brussels, Belgium, a corporation of Belgium
No Drawing. Filed Feb. 20, 1963, Ser. No. 260,062
Claims priority, application Great Britain, Feb. 21, 1962, 6,798/62
8 Claims. (Cl. 260—465.9)

The present invention relates to the preparation of unsaturated nitriles from the corresponding aldehydes containing 3 to 12 carbon atoms and, more particularly, to the preparation of acrylonitrile from acrolein.

According to this process, a gaseous mixture of an aldehyde containing from 3 to 12 carbon atoms, oxygen or an oxygen containing gas and optionally an inert diluent gas and/or water vapor is contacted with a catalyst consisting of at least one oxygenated salt of arsenic and of an element less electro-negative than arsenic. These catalysts can also contain an excess of arsenic oxides and/or of one or more oxides of the aforesaid elements. The less electro-negative elements to be considered are, for example, iron, bismuth, cadmium, aluminum, calcium, magnesium, zinc, tin, zirconium, chromium, cobalt, lead, nickel, manganese, antimony, vanadium, copper, boron, germanium, molybdenum and tungsten.

By oxygenated salts of arsenic is meant arsenites and arsenates in their various forms and mixtures thereof. The best results have been obtained with iron arsenate and mixtures thereof with other metal oxides and arsenates.

The oxygenated arsenic salts of the catalysts are definite compounds possessing specific properties. These properties are substantially different from those of mixtures of the oxides entering into the composition of the said oxygenated arsenic salts. This is true, for example, with regard to the melting point, the temperature of decomposition and the catalytic properties.

These catalysts are, in particular, prepared by the action of arsenic acids on one or more salts, oxides or hydroxides of elements which are less electro-negative than arsenic. They can also be obtained by the action of arsenic acids on these elements. They may also be prepared by a double decomposition reaction between arsenates and salts or from arsenic trioxide.

These catalysts may be subjected to an activation or stabilization treatment at various temperatures, in the presence of air, ammonia, water vapor or mixtures thereof, in such a manner as to impart to them particular physical properties and a definite chemical composition. This treatment may also be used to drive off arsenic compounds which are volatilizable at temperatures equal to or higher than the reaction temperature.

The catalysts are generally used in the form in which they are produced. They may also be distributed on carrier materials, such as pumice stone, colloidal silica, alumina or Carborundum.

The catalysts are generally in the form of crushed, sized grains or of powders which can be formed into pastilles or granules. In particular, catalysts in powder form can be obtained by atomization of solutions, suspensions or gels. They can easily be obtained in the form of particles lending themselves readily to fluidization and having good resistance to attrition. These catalysts can be used in a fixed bed and in a fluidized or moving bed, according to the usual techniques.

As mentioned above, these catalysts are used for the preparation of unsaturated nitriles from the corresponding unsaturated aldehydes. However, for the sake of clarity of explanation, the following description applies, more particularly, to the conversion of acrolein and ammonia into acrylonitrile.

We have found that when the conversion of acrolein into acrylonitrile is not complete, secondary reactions occur between unreacted acrolein and ammonia, which results in the deposition of polymerized materials in the less hot portions of the apparatus following the reactor, and in a rapid obstruction of the pipes.

Among the catalysts hereinbefore described, certain have the property of completely converting acrolein and ammonia into useful products, when the concentration of acrolein in the mixture fed to the reaction vessel is moderate, for example 2 percent by volume. The yield of acrylonitrile may thus reach 95%, the balance being hydrocyanic acid plus optionally traces of carbon oxides.

When the concentration of acrolein in the feed to the reaction is increased, for example to concentration of about 4 percent by volume, the conversion of acrolein remains complete. But, owing to the larger amount of heat set free by the reaction, there may be formed small amounts of carbon oxides. It is well known that, to a certain extent, this phenomenon may be overcome by a judicious selection of certain variables such as the diameter of the catalytic tube, the size and density of the catalyst particles, the reaction temperature, the linear reaction velocity, and so on.

The temperature of the reaction is generally between 200 and 450° C., the best results being obtained when operating at temperatures between 300 and 425° C.

The duration of the reaction obviously depends upon the temperature and the desired rate of conversion of the reactants. By apparent contact time is meant the quotient of the apparent volume of the catalyst bed by the flow rate of the reaction mixture per second under the conditions of operation; this time, which in the present case may vary in the range of 0.01 to 20 seconds, is preferably between 0.05 and 10 seconds.

The operation is preferably carried out at atmospheric pressure but higher pressures can also be used.

The reaction mixture is composed of acrolein, ammonia, oxygen or a gas containing oxygen, such as air, and, optionally, an inert diluent gas, such as nitrogen or propane, and/or water vapor.

Important factors in the proceeding of the reaction are the composition of the reaction mixture and the proportions of the reactants to one another, which proportions can vary within wide limits. Thus, for each part by volume of acrolein, there may be used 0.2 to 5 parts by volume of ammonia, 0.1 to 20 parts by volume of oxygen and 0 to 10 parts by volume of water vapor. The diluents, if used, may be nitrogen, carbon oxides, low molecular saturated hydrocarbons or mixtures thereof; their proportions may vary within wide limits. As to the concentration of acrolein in the feed to the reaction, this may vary between about 0.1 to 10 percent by volume, preferably in the range of 1 to 5 percent by volume.

The gases leaving the reactor are analyzed either directly by chromatography in the gaseous phase or after preliminary absorption in water. The effluent gases contain acrylonitrile, unchanged ammonia and hydrocyanic acid. Practically carbon oxides are not formed and the presence of acetonitrile is not observed.

The recovery of the valuable products obtained during the reaction is carried out by known methods, for example, by absorption in water or by condensation below the dew point of acrylonitrile.

The process of the present invention allows to obtain conversions of acrolein of 100 percent and yields of about 95 percent of acrylonitrile.

When comparing the process for the preparation of acrylonitrile according to our Belgian Patent 617,523 with the process of the present invention, it has been observed that the latter offers the advantage that the consumption of ammonia is much lower, i.e., from 1.4 to 1.7 mols of ammonia used per mol of acrylonitrile formed, instead of 2 to 3 mols.

The following examples are given for the purpose of illustrating the present invention. Except where otherwise indicated, the quantities of gas are expressed in percentages by volume. By conversion of acrolein is meant the proportion of acrolein converted in the course of the reaction, by acrolonitrile efficiency is meant the proportion of acrolein which is converted into acrylonitrile and by yield of acrylonitrile is meant the quotient of the acrylonitrile efficiency by the conversion of acrolein.

*Example 1.—Preparation of catalysts*

Catalyst No. 1: 55.9 g. of iron are dissolved in a mixture of 250 ml. of nitric acid (d. 1.4) and 500 ml. of water at 90–95° C. 188.4 g. of an aqueous solution of arsenic pentoxide (60% by weight) are added thereto. The mixture is evaporated to dryness in an oven at 110° C. and the residue then calcined at 450° C. for 24 hours. The mass obtained is finely ground, homogenized and formed into pastilles of the desired granule size.

Catalyst No. 2: 78.2 g. of iron are dissolved in a mixture of 350 ml. of nitric acid (d. 1.4) and 700 ml. of water at 90–95° C. 383.3 g. of an aqueous solution of arsenic pentoxide (60% by weight) and 174.6 g. of cobalt nitrate hexahydrate in solid form are then added to this solution. The mixture is evaporated to dryness in an oven at 110° C. and then calcined for 24 hours at 450° C.

Catalyst No. 3: 291 g. of cobalt nitrate hexahydrate are dissolved in 206 g. of an aqueous solution of arsenic pentoxide brought to 90–95° C. This solution is evaporated to dryness at 110° C. in a hot air oven. The resulting mass is calcined at 450° C. for 34 hours. The mass is calibrated or formed into pastilles of the desired size, depending on whether the catalyst is to be used in fluidized, fixed or moving bed.

Catalyst No. 4: 970 g. of bismuth nitrate pentahydrate are dissolved in 500 ml. of water brought to 90° C. and containing a sufficient amount of nitric acid to avoid hydrolysis of the bismuth salt. 383 g. of a 60% aqueous solution of arsenic pentoxide are added thereto, with stirring. The resulting precipitate is washed five times with boiling water by decantation, then filtered on a Büchner funnel and finally washed again with water. The resulting mass is dried in a hot air oven at 110° C. for 12 hours. The mass is calcined at 450° C. for 24 hours.

Catalyst No. 5: 210.6 g. of tin tetrachloride pentahydrate are added to 151 g. of a 60 percent aqueous solution of arsenic pentoxide brought to 90° C., with stirring. The resulting gel is brought to dryness in an oven at 110° C. and then calcined at 450° C. for 24 hours.

Catalyst No. 6: 716 g. of a 50 percent aqueous solution of manganese nitrate and 421 g. of a 60 percent aqueous solution of arsenic pentoxide is brought to dryness in a porcelain dish. The mixture is dried for 12 hours at 110° C. and calcined at 450° C. for 24 hours.

Catalyst No. 7: 873 g. of nickel nitrate hexahydrate are dissolved in 383.3 g. of a 60 percent aqueous solution of arsenic pentoxide brought to 90–95° C. The solution is evaporated to dryness at 110° C. in a hot air oven. The resulting mass is calcined for 24 hours at 450° C.

Catalyst No. 8: This catalyst is prepared in the same way as catalyst No. 7 but using 925.5 g. of cadmium nitrate quadrahydrate instead of 873 g. of nickel hydrate.

Catalyst No. 9: 364 g. of vanadium pentoxide are mixed in a porcelain dish with 383.3 g. of a 60 percent aqueous solution of arsenic pentoxide. The reaction is initiated by slight heating and then, after it has set into a mass, the mixture is calcined at 450° C. for 24 hours.

Catalyst No. 10: 121.8 g. of antimony are dissolved in a mixture of 130 ml. of nitric acid (d. 1.4) and 390 ml. of concentrated hydrochloric acid. 320 g. of a 60 percent aqueous solution of arsenic pentoxide are added thereto and the solution then concentrated until a syrupy mass is obtained. This mass is calcined at 450° C. for 12 hours.

Catalyst No. 11: This catalyst is prepared in the same way as Catalyst No. 7 but using 187.5 g. of aluminum nitrate nonahydrate and 287.5 g. of a 60 percent aqueous solution of arsenic pentoxide.

*Example 2*

80 ml. of Catalyst No. 1 are placed in a stainless steel U-shaped reactor with a diameter of 15 mm. At a temperature of 380° C. and with a contact time of 0.5 second, a stream of gas containing 2 percent of acrolein, 2.6 percent of ammonia and 95.4 percent of air is passed therethrough. The gases leaving the reactor are washed with a dilute solution of sulfuric acid in a trickle column. The conversion of acrolein is 100 percent, the yield of acrylonitrile being 92.2 percent, together with 6.5 percent hydrocyanic acid. No carbon monoxide or carbon dioxide is formed.

*Example 3*

The operation is carried out as in Example 2 but using Catalyst No. 2. At 350° C. and with a contact time of 0.5 second, the conversion of acrolein is 100 percent, the yields of acrylonitrile and of hydrocyanic acid being, respectively, 94.5 percent and 4.5 percent. No carbon oxides are formed.

*Example 4*

The operation is carried out as in Example 2 but using Catalyst No. 3. At 380° C. and with a contact time of 0.5 second, the acrylonitrile and hydrocyanic acid efficiencies are, respectively, 10.5 percent and 0.8 percent. The formation of carbon oxides is small; the remainder of the acrolein gives polymerization products. A comparison of this example with Examples 2 and 3 shows the favorable part played by iron in the arsenical catalysts of the present invention.

*Examples 5–12*

The operation is carried out as in Example 2, with various catalysts. The results obtained are set out in the following table. In this table:

$t°$=reaction temperature in ° C.,
T.C.=contact time in seconds,
C.A.=conversion of acrolein expressed in percent mols,
E.A.=acrylonitrile efficiency expressed in percent mols.

| Example | Catalyst | t° | T.C. | C.A. | E.A. |
|---|---|---|---|---|---|
| 5 | 4 | 380 | 0.5 | 93.5 | 79.4 |
| 6 | 5 | 400 | 0.5 | 57.2 | 32.5 |
| 7 | 6 | 400 | 0.5 | 61.1 | 28.6 |
| 8 | 7 | 380 | 0.5 | 55.0 | 22.1 |
| 9 | 8 | 420 | 0.5 | 82.5 | 47.7 |
| 10 | 9 | 400 | 0.5 | 93.7 | 50.3 |
| 11 | 10 | 380 | 0.5 | 66.7 | 41.1 |
| 12 | 11 | 400 | 0.5 | 50.0 | 20.4 |

*Example 13*

300 ml. of Catalyst No. 1 are placed in a stainless steel tubular reactor with interior diameter of 15 mm. and maintained at the desired temperature by a nitrate-nitrite bath. At a temperature of 400° C. and with a contact time of 1.2 seconds, a stream of gas containing 3.7 percent of acrolein, 5.5 per cent of ammonia, 52.5 percent of air, 7.8 percent of nitrogen and 30.8 percent of water vapor is passed therethrough. The conversion of acrolein is 100 percent. The yield of acrylonitrile is 87.1 percent, the balance being 6.6 percent of hydrocyanic acid, 4.3 percent of carbon monoxide and 2.0 percent of carbon dioxide.

We claim:

1. A process for the production of acrylonitrile which comprises contacting at a temperature between 200 and 450° C. for a period of from 0.01 to 20 seconds a gaseous mixture of acrolein, ammonia and molecular oxygen with, as catalyst, a member selected from the group consisting of iron arsenite and iron arsenate and mixtures thereof.

2. A process for the production of acrylonitrile which comprises contacting at a temperature between 200 and 450° C. for a period of from 0.01 to 20 seconds a gaseous mixture of acrolein, ammonia and molecular oxygen with, as catalyst, iron arsenate.

3. A process according to claim 1, wherein the catalyst is supported on a carrier material selected from the group consisting of pumice stone, silica, alumina and Carborundum.

4. A process according to claim 2, wherein the temperature is within the range from 300° to 425° C.

5. A process according to claim 2, wherein the gaseous mixture contains for each part by volume of acrolein, 0.2 to 5 parts by volume of ammonia, 0.1 to 20 parts by volume of oxygen and 0 to 10 parts by volume of water vapor.

6. A process according to claim 2, wherein the concentration of acrolein in the gaseous mixture fed to the reaction is of 0.1 to 10 percent by volume.

7. A process according to claim 2, wherein the concentration of acrolein in the gaseous mixture fed to the reaction is of 1 to 5 percent by volume.

8. A process for the production of acrylonitrile which comprises contacting at a temperature between 200 and 450° C. for a period of from 0.01 to 20 seconds a gaseous mixture of acrolein, ammonia and molecular oxygen with a catalyst obtained by calcining at elevated temperature the dried residue of a solution obtained by intimately mixing iron dissolved in aqueous nitric acid with an aqueous solution of arsenic pentoxide and of cobalt nitrate.

References Cited by the Examiner
UNITED STATES PATENTS
2,691,037  10/54  Bellringer et al. _____ 260—465.9

CHARLES B. PARKER, *Primary Examiner.*